US009912227B2

United States Patent
Zoppi et al.

(10) Patent No.: US 9,912,227 B2
(45) Date of Patent: Mar. 6, 2018

(54) DEVICE FOR OPERATIONAL STATE RECOVERY AND CORRESPONDING EQUIPMENT

(71) Applicant: STMICROELECTRONICS S.R.L., Agrate Brianza (IT)

(72) Inventors: Giulio Zoppi, Palermo (IT); Roberto Larosa, Viagrande (IT); Natale Aiello, Trecastagni (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 101 days.

(21) Appl. No.: 14/964,818

(22) Filed: Dec. 10, 2015

(65) Prior Publication Data

US 2016/0241130 A1    Aug. 18, 2016

(30) Foreign Application Priority Data

Feb. 17, 2015  (IT) ................ TO2015A0104

(51) Int. Cl.
*H02M 1/36* (2007.01)
*H02M 7/04* (2006.01)
*H02M 1/00* (2006.01)

(52) U.S. Cl.
CPC ............ *H02M 1/36* (2013.01); *H02M 7/04* (2013.01); *H02M 2001/0032* (2013.01); *Y02B 70/16* (2013.01)

(58) Field of Classification Search
CPC .. H02M 1/36; H02M 7/04; H02M 2001/0032; Y02B 70/16
See application file for complete search history.

(56) References Cited

U.S. PATENT DOCUMENTS

| 5,812,385 A | 9/1998 | Leu |
| 6,828,693 B2 * | 12/2004 | von Staudt ............ H01H 9/547 307/10.1 |
| 2007/0202932 A1 * | 8/2007 | Keller ..................... H02J 9/005 455/574 |
| 2014/0056040 A1 | 2/2014 | Larosa et al. |
| 2014/0321004 A1 * | 10/2014 | Lukas .................... A61G 7/018 361/18 |

FOREIGN PATENT DOCUMENTS

EP    2458707    5/2012

* cited by examiner

*Primary Examiner* — Jue Zhang
(74) *Attorney, Agent, or Firm* — Slater Matsil, LLP

(57) ABSTRACT

A device for driving a power supply start-up circuit may include a logic unit for storing an operating state of equipment, where the logic unit is activatable by a start-up signal reaching a start-up threshold. The device may also include a detector, where the detector provides a signal to the logic unit indicating a drop in the signal below a drop threshold. The detector may enable the logic unit to continue operating in the presence of a failure of a power supply to store the operating state of the equipment upon occurrence of the failure of the power supply. In addition, the device may include a start-up circuit sensitive to a power supply signal, where the start-up circuit is activatable by the power supply signal as restored after the failure, and the start-up circuit may provide the start-up signal reaching the start-up threshold upon the power supply signal being restored.

20 Claims, 2 Drawing Sheets

DEVICE FOR OPERATIONAL STATE RECOVERY AND CORRESPONDING EQUIPMENT

TECHNICAL FIELD

The present disclosure relates to operational state recovery in electronic equipment, and, more particularly, to a device to recover the operational state of remote-controlled equipment with zero power consumption while in stand-by.

BACKGROUND

Equipment such as an electronic appliance capable of achieving "zero" consumption during stand-by may comply with various criteria. For instance, the system may default to an inactive (zero consumption) state when plugged and/or the circuit modules including any logic units may be shut down (turned off) when the system is inactive.

Also, activating the system when inactive may involve a human intervention, for example, a remote control unit (InfraRed—IR or RadioFrequency—RF) or a start button to generate a dedicated start-up signal ("start-up stimuli") acting on a dedicated zero-stand-by start-up circuit for the power supply. Such a circuit may include, e.g., a Switched-Mode Power Supply (SMPS) which may start-up if a voltage VSTUP goes above a start-up threshold VTHstup (e.g. around 12V). In certain implementations, the system may be able to keep running after start-up without the contribution of the start-up circuit itself.

SUMMARY

A basic drawback of certain implementations may lie in that after a failure the system defaults to an inactive state, so that a new start-up intervention may be required in order to recover a previous operation.

The need is thus felt for improved arrangements which may address that drawback.

According to one aspect, a device for driving a power supply start-up circuit for equipment fed with a power supply signal over a power supply line may include a logic unit for storing the operating state of the equipment, where the logic unit is activatable by a start-up signal over a start-up line reaching a start-up threshold.

The device may also include a detector coupled to the start-up line, where the detector provides to the logic unit a signal indicating a drop in the signal over the start-up line below a drop threshold. The detector may enable the logic unit to continue operating in the presence of a failure of the power supply signal on the power supply line to store the operating state of the equipment upon occurrence of a failure of the power supply signal. In addition, the device may include a start-up circuit sensitive to the power supply signal on the power supply line, where the start-up circuit is activatable by the power supply signal on the power supply line as restored after a failure, and the start-up circuit may provide the start-up signal reaching the start-up threshold upon the power supply signal being restored.

One or more embodiments may permit operational state recovery after a main failure (e.g. blackout) for an electronic appliance with zero consumption when inactive (zero stand-by).

BRIEF DESCRIPTION OF THE FIGURES

One or more embodiments will now be described, purely by way of non-limiting example, with reference to the annexed figures, wherein.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

The diagrams in the figures are generally illustrative of a system for activating associated equipment (e.g., an electronic appliance fed with a power supply signal VL over a power supply line) by means of a power supply start-up circuit including, for example, a Switched-Mode Power Supply (SMPS) of any known type. In one or more embodiments, the power supply start-up circuit may be included in the equipment 10 fed with the power supply signal VL.

While in the figures enclosed herewith the power supply start-up circuit is assumed to be included in the associated equipment (so that the reference 10 may be indicative of both), in one or more embodiments the power supply start-up circuit may be a separate element operatively connected to the associated equipment.

The power supply start-up circuit may be configured, in a manner known per se, to start-up the associated equipment if a voltage VSTUP applied over start-up line to an input 12 goes above a start-up threshold VTHstup (e.g., around 12V).

Figure 1:
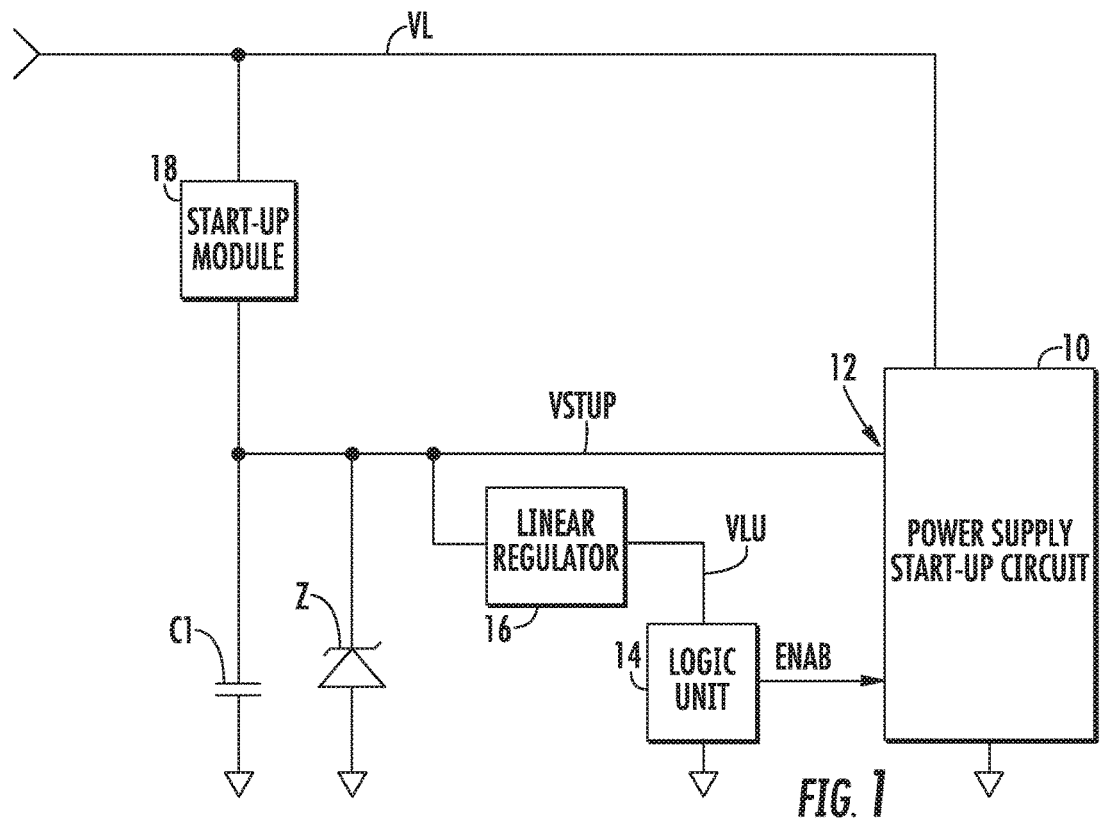
FIG. 1 is a schematic block diagram of a device for driving a power supply start-up circuit in a particular embodiment.

In one or more embodiments (for example, as shown in FIG. 1), the power supply start-up circuit 10 may be activated by start-up stimuli provided, in a manner known per se (see e.g. US 2014/0056040 A1), for instance by an InfraRed (IR) or RadioFrequency (RF) remote control unit, not visible in the figures. Such start-up stimuli may be received by a start-up module such as, e.g., an IR/RF receiver 18 essentially acting as a switch adapted to transfer the power supply signal VL to the input 12 of the power supply start-up circuit 10. Also, a start-up button may be used for that purpose e.g. to receive start-up stimuli applied by a human.

In one or more embodiments, a logic unit 14 may be provided which may be activated by a power supply VSTUP, e.g. via a linear regulator 16 which may feed the logic unit 14 with a voltage VLU downscaled, for example, from a value of VSTUP of about 15V to a lower voltage, e.g., 3.3V.

In one or more embodiments, the logic unit 14 may turn on during a start-up phase (e.g., by possibly being the first element to turn on during the start-up phase) in order to acknowledge the start-up stimuli with an embedded code in order to add robustness to the system.

In one or more embodiments as considered herein, the voltage VSTUP may build up in hundreds of milliseconds, so that the voltage VLU will be stable and the logic unit 14 may turn on when VSTUP is still building up.

In one or more embodiments, the logic unit 14 may rapidly take control of the system thus preventing the power supply start-up circuit 10 from starting up until the start-up stimuli received via the receiver 18 have been acknowledged. To that effect, in one or more embodiments, the logic unit 14 (which may be configured to send an enable signal ENAB to the power supply start-up circuit 10) may be activated (long) before the start-up value is reached by VSTUP so that the system may be disabled until acknowledgement takes place, e.g., by the code referred to in the foregoing.

In one or more embodiments, a capacitor C1 and a Zener diode Z may be coupled, for example, to the output of the start-up module (e.g., receiver) 18, namely to the start-up line leading to the input 12 of the power supply start-up circuit 10 and feeding the logic unit 14, e.g., via the regulator 16.

In one or more embodiments, the capacitor C1 may play an active role during build-up of VSTUP. This may be regarded essentially as a ramp signal having a slope, which is a function of the capacitance value of C1 (see e.g. US 2014/0056040 A1, already cited). In one or more embodiments, the logic unit 14 may turn on during the first build-up phase of the ramp, for example, VSTUP equal to 3.3 V or higher, when the corresponding voltage has just reached a value higher than the value permitting operation of the logic unit 14.

In one or more embodiments, the Zener diode Z may prevent the start-up line (VSTUP) from reaching (voltage) levels in excess of the limit values admitted for the circuits coupled therewith.

In one or more embodiments, this arrangement may permit to exploit the logic unit 14 for storing the operating state of the system in order to meet a given operating target.

Figure 2:
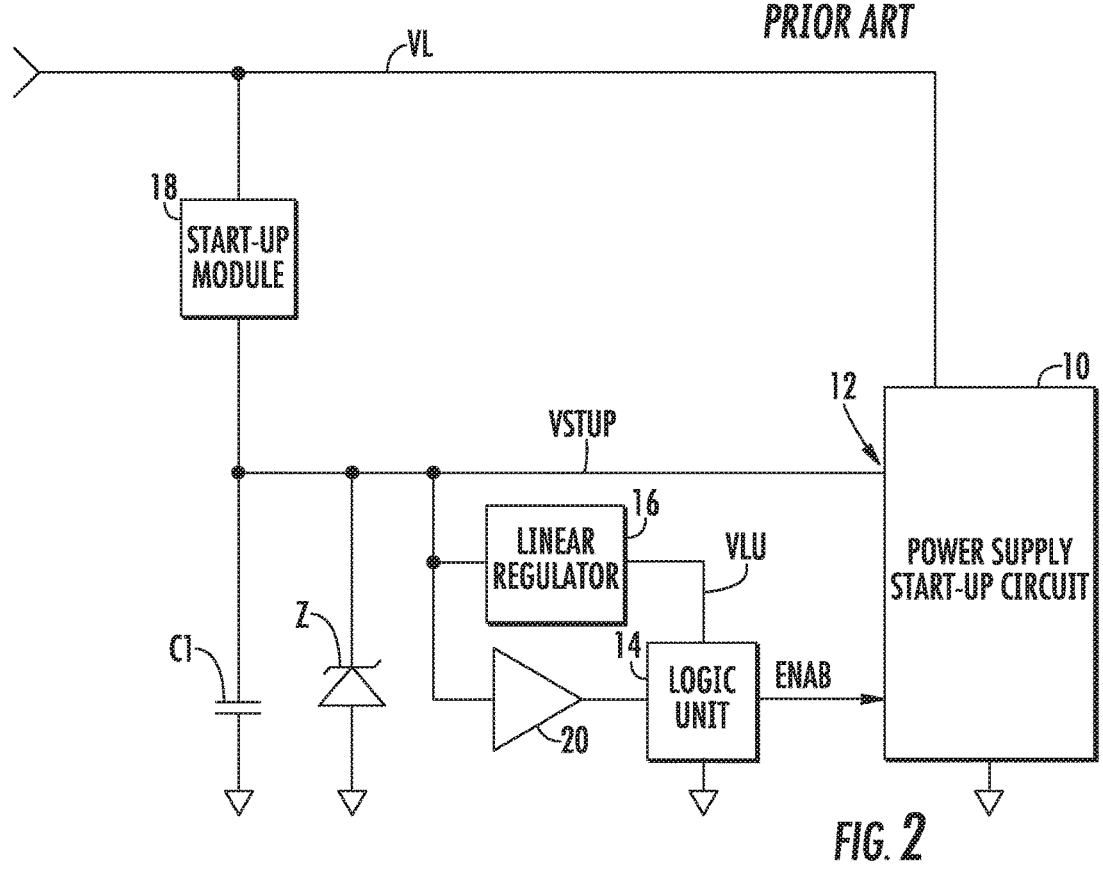
FIG. 2 is a schematic block diagram of the device that includes a voltage detector in a particular embodiment.

One or more embodiments (see e.g. FIGS. 2 to 4) may include a voltage detector 20 for providing the capability of assessing a faulty condition such as a power loss due, for example, to a mains M failure (blackout), so that the input line voltage VL will become unavailable and VSTUP will drop accordingly.

The detector 20 will detect such an event and provide to the logic unit 14 a corresponding signal indicating that VSTUP is dropping below a safety (drop) threshold.

Measures may be taken in order to ensure that, in the event of power failure, the logic unit 14 will be the last element to stop working after the power failure. For instance, in one or more embodiments, the threshold of the detector 20 may set high enough to permit the logic unit 14 to continue operating for a time interval during which the operating state may be stored, for example, in a non-volatile memory coupled with (optionally included in) the logic unit 14.

In one or more embodiments, the detector 20 and the logic unit 14 may thus co-operate in making the system capable of detecting and storing the information related to a faulty condition.

An issue in automatically recovering the operating state may lie in that, after the power has been restored (e.g., with the input line voltage VL available again) the system may default to inactive until coded start-up stimuli are applied to the start-up module 18, e.g., a result of a human intervention (e.g., IR or RF remote control, start-up button, and so on).

One or more embodiments may rely on the observation that, for example due to parasitic effects, when the system is plugged in or the mains is restored after, e.g., a blackout or a voltage spike (e.g., a few volts) may appear on VSTUP for a short time, until the system reaches steady state operation. This per se undesired effect may turn out to be beneficial in permitting operational state recovery.

Figure 3:
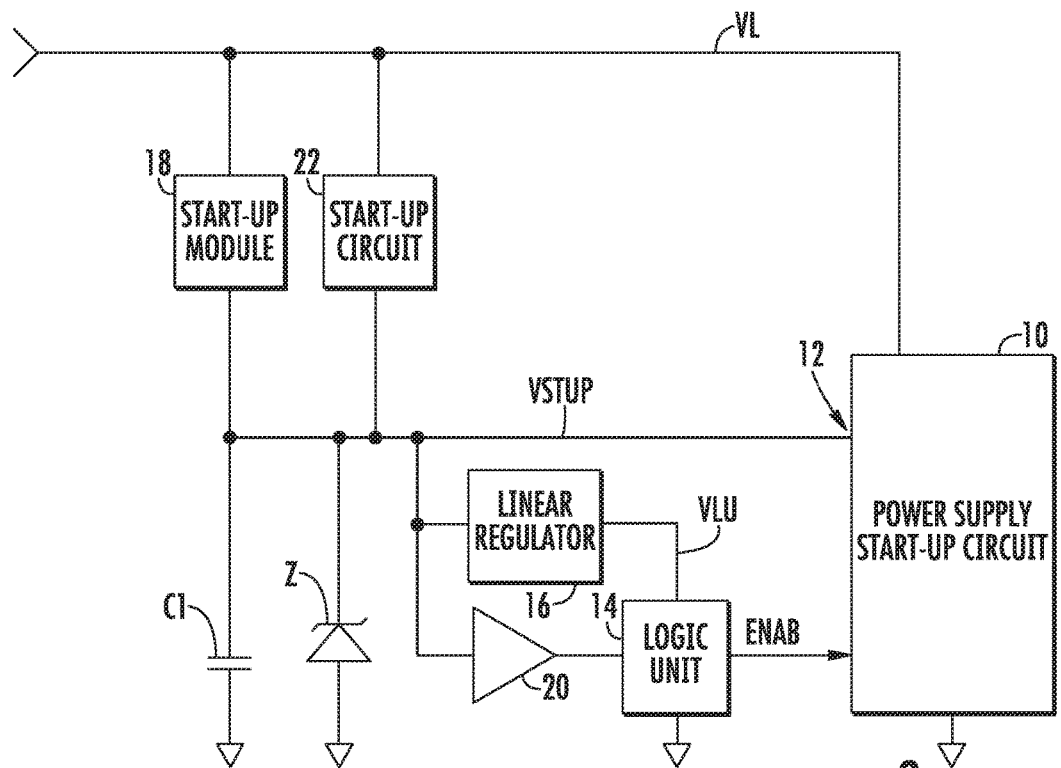
FIG. 3 is a schematic block diagram of the device that includes a start-up circuit in a particular embodiment.
Figure 4:
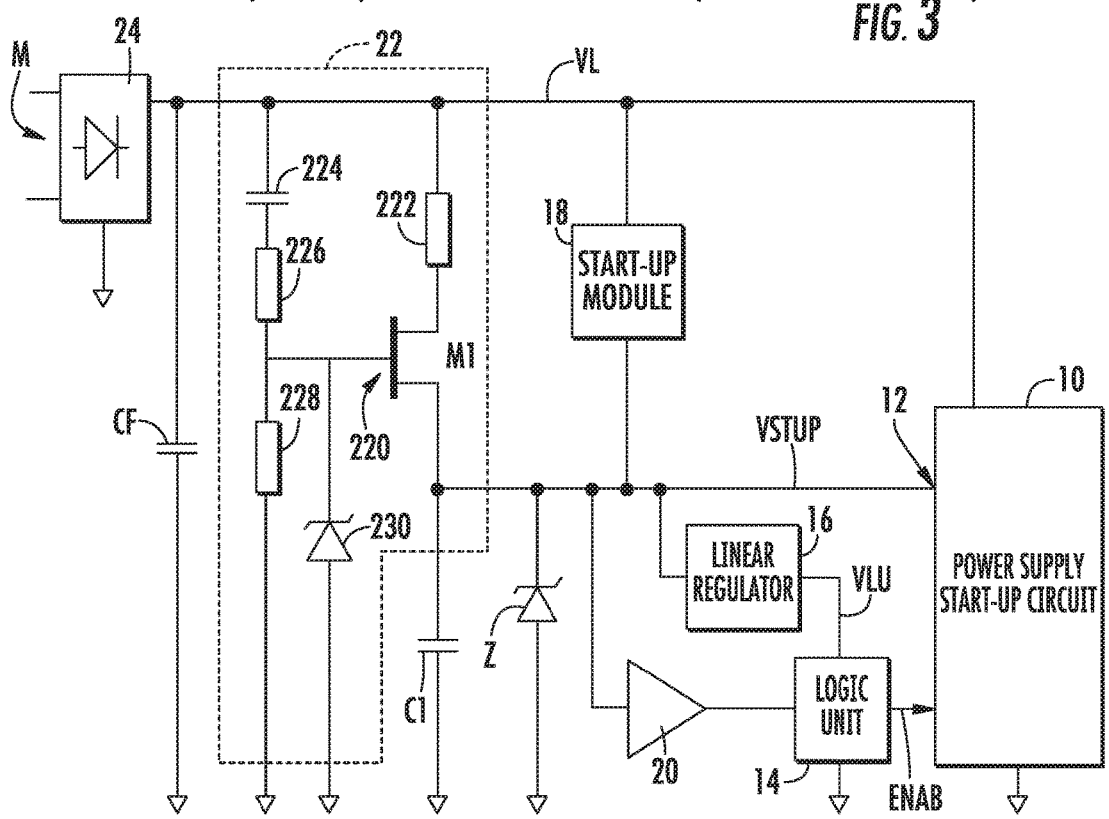
FIG. 4 is a schematic block diagram that includes details of the start-up circuit of FIG. 3 in a particular illustrative embodiment.

To that effect, as exemplified in FIGS. 3 and 4, in one or more embodiments a circuit 22 may be coupled to the system which may become activated for a limited amount of time, e.g. when VL is building up.

In one or more embodiments, the circuit 22 may be devised with the purpose of charging the capacitor C1 under these conditions so that the voltage VSTUP satisfies the start-up condition, e.g. VSTUP>VTHstup for the power supply start-up circuit.

FIG. 4 shows a possible implementation of such a "mains activated" start-up circuit 22, including an electronic switch, e.g. a transistor such as a FET 220. In a possible embodiment, the conduction (e.g. source-drain) line of the transistor 220 may extend between the supply line (at voltage VL, e.g., powered from the mains M via a rectifier 24 and a filter capacitor CF) and ground.

One of the conduction terminals (e.g. the source) of the transistor 220 may thus be connected to the line providing the voltage VSTUP in order to charge the capacitor C1 via a resistor 222.

Operation (e.g. "turn-on" to the conductive state) of the transistor 220 may be driven by a pull-up circuit acting on the gate of the transistor 220 and including the series connection of a capacitor 224 and a resistor 226 between the input line (voltage VL) and the gate of the transistor 220, and the parallel connection of a resistor 228 and a Zener diode 230 between the gate of the transistor 220 and ground.

After a blackout the voltage VL will undergo a rapid transient, and the circuit 22 is arranged in order to respond to this transient by forcing VSTUP to a value satisfying the startup condition, e.g. VSTUP>VTHstup, thus enabling the logic unit 14 to turn on the power supply start-up circuit 10.

In one or more embodiments, the logic unit 14 will be operative when the condition above is met, since the logic unit 14 will have been activated (long) in advance thus being in a position to decide if system turn-on should be enabled. Once the system is turned on, even if VSTUP is no longer affected by the circuit 22 (since the transient on VL has ended), the circuit 10 will maintain VSTUP at an operating value e.g. by means of an auxiliary circuit. One such circuit may be included in, e.g., a SMPS.

In one or more embodiments as considered in the foregoing, the logic unit 14 may thus be able check the system state saved in its associated memory.

If a "faulty" condition was stored (e.g. operation of the system interrupted due to a power failure) the logic unit 14 is now able to turn on the SMPS.

Conversely, if no such condition was stored, for example because the system had been positively turned off before removing the voltage VL on the input line or because the system is plugged in the first time, the logic unit 14 will not enable the SMPS and the system will be maintained in a turn-off condition until positively activated, while VSTUP may dissipate, e.g., due to the activity of the logic unit 14.

Without prejudice to the underlying principles, the details and embodiments may vary, even significantly, with respect to what is illustrated herein purely by way of non-limiting example, without thereby departing from the extent of protection.

The invention claimed is:

1. A device for driving a power supply start-up circuit for equipment fed with a power supply signal over a power supply line, the device comprising:
   a start-up line;
   a logic unit configured to store an operating state of the equipment, and being activatable by a start-up signal over the start-up line reaching a start-up threshold;
   a detector coupled to the start-up line and configured to provide to the logic unit a signal indicating a drop in the power supply signal over the start-up line below a drop threshold, and to enable the logic unit to continue operating in a presence of a failure of the power supply signal on the power supply line and enable the logic unit to store the operating state of the equipment upon the failure of the power supply signal; and
   a start-up circuit activatable by a voltage spike of the power supply signal on the power supply line as restored after the failure, and configured to provide the start-up signal upon reaching the start-up threshold when the power supply signal is restored.

2. The device of claim 1, further comprising a start-up module configured to receive and apply start-up stimuli to the power supply start-up circuit, and wherein the logic unit is activatable to acknowledge the start-up stimuli.

3. The device of claim 1, further comprising a linear regulator configured to feed the logic unit with a downscaled version of the start-up signal on the start-up line.

4. The device of claim 1, further comprising:
   a capacitor coupled with the start-up line to enable activation of the logic unit during build-up of the start-up signal; and
   a Zener diode coupled with the start-up line to prevent the start-up line from reaching a level in excess of a limit value.

5. The device of claim 1, wherein the logic unit comprises a non-volatile memory to store the operating state of the equipment.

6. A device for driving a power supply start-up circuit for equipment fed with a power supply signal over a power supply line, the device comprising:
   a start-up line;
   a logic unit configured to store an operating state of the equipment, and being activatable by a start-up signal over the start-up line reaching a start-up threshold;
   a detector coupled to the start-up line and configured to provide to the logic unit a signal indicating a drop in the power supply signal over the start-up line below a drop threshold, and to enable the logic unit to continue operating in a presence of a failure of the power supply signal on the power supply line and enable the logic unit to store the operating state of the equipment upon the failure of the power supply signal; and
   a start-up circuit activatable by the power supply signal on the power supply line as restored after the failure, and configured to provide the start-up signal upon reaching the start-up threshold when the power supply signal is restored;
   a capacitor coupled with the start-up line to enable activation of the logic unit during build-up of the start-up signal; and
   a Zener diode coupled with the start-up line to prevent the start-up line from reaching a level in excess of a limit value, wherein the start-up circuit comprises an electronic switch having a control terminal driven by the power supply signal on the power supply line to charge the capacitor at a voltage corresponding to the start-up signal.

7. The device of claim 6, wherein the electronic switch comprises a transistor, which, when in a conductive state, couples the capacitor to the power supply line.

8. The device of claim 6, further comprising the Zener diode in parallel to the capacitor.

9. The device of claim 6, wherein the start-up circuit further comprises:
   a first resistor and a first capacitor coupled in series between the power supply line and the control terminal of the electronic switch; and
   a second resistor and the Zener diode coupled in parallel between the control terminal of the electronic switch and voltage reference.

10. An electronic device comprising:
    a power supply start-up circuit for equipment fed with a power supply signal over a power supply line; and
    a device comprising
       a logic unit configured to store an operating state of the equipment,
       a detector coupled to a start-up line and configured to provide to the logic unit a signal indicating a drop in the power supply signal, and to store the operating state of the equipment upon occurrence of a failure of the power supply signal, and
       a start-up circuit configured to respond to the power supply signal and to provide a start-up signal reaching a start-up threshold upon the power supply signal being restored, and
       a capacitor coupled with the start-up line and configured to enable activation of the logic unit, wherein the start-up circuit comprises an electronic switch having a control electrode driven by the power supply signal on the power supply line to charge the capacitor at a voltage corresponding to the start-up signal.

11. The electronic device of claim 10, further comprising a start-up module configured to receive and apply start-up stimuli to the power supply start-up circuit, and wherein the logic unit is activatable to acknowledge the start-up stimuli.

12. The electronic device of claim 10, further comprising a linear regulator configured to feed the logic unit with a downscaled version of the start-up signal on the start-up line.

13. The electronic device of claim 10, further comprising a Zener diode coupled with the start-up line and configured to prevent the start-up line from reaching levels in excess of limit values admitted for circuits coupled therewith.

14. The electronic device of claim 13, further comprising the Zener diode in parallel to the capacitor.

15. The electronic device of claim 10, wherein the logic unit comprises a non-volatile memory to store the operating state of the equipment.

16. The electronic device of claim 10, wherein the electronic switch comprises a transistor, which, when in a conductive state, couples the capacitor to the power supply line.

17. A method for driving a power supply start-up circuit for equipment fed with a power supply signal over a power supply line, the method comprising:

storing an operating state of the equipment in a logic unit that is activatable by a start-up signal over a start-up line reaching a start-up threshold;

providing a signal to the logic unit indicating a drop in the power supply signal over the start-up line is below a drop threshold, and enabling the logic unit to continue operating in a presence of a failure of the power supply signal on the power supply line, and enabling the logic unit to store the operating state of the equipment in the logic unit upon the failure of the power supply signal; and activating a start-up circuit based on a voltage spike of the power supply signal on the power supply line as restored after the failure, and providing the start-up signal upon reaching the start-up threshold based on the voltage spike and on the stored operating state of the equipment when the power supply signal is restored.

18. The method of claim 17, further comprising receiving and applying start-up stimuli to the power supply start-up circuit, and wherein the logic unit is activatable to acknowledge the start-up stimuli.

19. The method of claim 17, further comprising feeding the logic unit with a downscaled version of the start-up signal on the start-up line.

20. The method of claim 17, further comprising driving a control terminal of an electronic switch with the power supply signal via a first capacitor; and charging a storage capacitor coupled to a load path terminal of the electronic switch via a load path of the electronic switch.

* * * * *